US008263226B2

(12) United States Patent
Rosenau et al.

(10) Patent No.: US 8,263,226 B2
(45) Date of Patent: Sep. 11, 2012

(54) MOISTURE-CURING HOTMELT ADHESIVES COMPRISING AT LEAST ONE SILANE-FUNCTIONAL POLYURETHANE PREPOLYMER

(75) Inventors: Sven Rosenau, Hamburg (DE); Kai Paschkowski, Jork (DE); Urs Burckhardt, Zurich (CH)

(73) Assignee: Sika Technology AG, Baar (CH)

( * ) Notice: Subject to any disclaimer, the term of this patent is extended or adjusted under 35 U.S.C. 154(b) by 695 days.

(21) Appl. No.: 12/086,748

(22) PCT Filed: Dec. 22, 2006

(86) PCT No.: PCT/EP2006/070161
§ 371 (c)(1),
(2), (4) Date: May 18, 2009

(87) PCT Pub. No.: WO2007/074143
PCT Pub. Date: Jul. 5, 2007

(65) Prior Publication Data
US 2010/0040894 A1 Feb. 18, 2010

(30) Foreign Application Priority Data
Dec. 23, 2005 (EP) .................... 05112960

(51) Int. Cl.
*B32B 27/40* (2006.01)
*B32B 37/02* (2006.01)
*B32B 9/00* (2006.01)
*C08G 18/28* (2006.01)
*B29C 65/52* (2006.01)

(52) U.S. Cl. .............. 428/425.6; 428/429; 428/447; 428/448; 525/454; 156/329

(58) Field of Classification Search ............... 428/423.1, 428/425.6, 429, 447, 448; 525/454; 156/329
See application file for complete search history.

(56) References Cited

U.S. PATENT DOCUMENTS

| 5,155,180 | A | | 10/1992 | Takada et al. | |
|---|---|---|---|---|---|
| 5,250,607 | A | * | 10/1993 | Comert et al. | 524/507 |
| 5,391,610 | A | * | 2/1995 | Comert et al. | 524/507 |
| 6,749,943 | B1 | | 6/2004 | Tangen et al. | |
| 2003/0092867 | A1 | | 5/2003 | Sato et al. | |
| 2004/0143034 | A1 | * | 7/2004 | Primke et al. | 523/176 |
| 2005/0032973 | A1 | * | 2/2005 | Krebs et al. | 524/589 |
| 2005/0032974 | A1 | * | 2/2005 | Krebs et al. | 524/589 |
| 2005/0215701 | A1 | | 9/2005 | Porsch et al. | |
| 2008/0125539 | A1 | * | 5/2008 | Mack | 524/588 |
| 2008/0312401 | A1 | * | 12/2008 | Sato et al. | 528/31 |

FOREIGN PATENT DOCUMENTS

| EP | 0 202 491 | A2 | 11/1986 |
|---|---|---|---|
| EP | 0 244 608 | A1 | 11/1987 |
| EP | 0 326 704 | A2 | 8/1989 |
| EP | 0 371 370 | A1 | 6/1990 |
| EP | 1 582 541 | A2 | 10/2005 |
| WO | WO 99/28363 | A1 | 6/1999 |
| WO | WO 2004/005420 | A1 | 1/2004 |

* cited by examiner

*Primary Examiner* — Thao T. Tran
(74) *Attorney, Agent, or Firm* — Oliff & Berridge, PLC

(57) ABSTRACT

The present invention relates to moisture-curing hotmelt adhesive compositions which comprise at least one silane-functional polyurethane prepolymer of the formula (I). The compositions have neither heating nor curing bubbles and feature an exceptional viscosity stability at high temperatures. These hotmelt adhesives are therefore suitable especially for industrial manufacture and especially of transparent materials.

20 Claims, No Drawings

MOISTURE-CURING HOTMELT ADHESIVES COMPRISING AT LEAST ONE SILANE-FUNCTIONAL POLYURETHANE PREPOLYMER

FIELD OF THE INVENTION

The invention relates to the field of moisture-curing hotmelt adhesives.

PRIOR ART

Hotmelt adhesives (hotmelts) are known adhesives. Adhesives of this kind are solvent-free adhesives which are solid at room temperature and which for the purpose of application are melted and, in the form of a melt, applied to the substrate to be bonded. In contrast to the so-called warmmelt adhesives (warmmelts), which constitute pasty adhesives and are applied at slightly elevated temperatures of up to typically 60° C., the application of the hotmelt adhesives takes place at temperatures of 85° C. and above. On cooling, the adhesives solidify. Conventional hotmelt adhesives are nonreactive adhesives, and consequently, on heating, they soften again or melt and are therefore unsuitable for use at elevated temperature. Moreover, conventional hotmelt adhesives often also tend to creep at temperatures well below the softening point (cold flow).

In the case of the so-called reactive hotmelt adhesives, these disadvantages have largely been eliminated through the introduction into the polymer structure of reactive groups that lead to crosslinking. As reactive groups, isocyanate groups more particularly have proven very suitable. The first result of cooling is the development of the early strength that is typical of hotmelt adhesives. Subsequently the polymers crosslink through reaction of the isocyanate groups by means of moisture. As a result of this crosslinking, adhesives of this kind can be used even at elevated temperature.

Reactive polyurethane hotmelt adhesives of this kind are known, from EP-A-0 244 608 or U.S. Pat. No. 5,155,180 or EP-A-1 036 103, for example, and are in widespread commercial use.

A disadvantage of the moisture-curing hotmelt adhesives containing isocyanate groups is that in many cases they lead to severe blistering, more particularly at elevated moisture and/or temperature levels. Blisters of this kind, however, are usually unwanted, particularly when the adhesive bonds in question are visible, of the kind that often occur in packaging applications, for example.

Silane-functional polyurethanes have already been in use for some time as moisture-curing adhesives and sealants. These silane-functional polyurethanes contain silane groups as reactive groups and are typically prepared by the reaction of aminosilanes with polyurethane prepolymers containing isocyanate groups. Polyurethane adhesives prepared in this way, however, have the great disadvantage that, on prolonged heating, the viscosity of the adhesive may experience a sudden sharp increase. EP-A-0 202 491 mentions silane-functionalized polyester melt adhesives in which an adduct of a polyester polyol and a diisocyanate is reacted with an amino- or mercaptosilane, or an adduct of an amino- or mercaptosilane and a diisocyanate is reacted with a polyester polyol. EP-A-0 371 370 discloses melt adhesives which after-crosslink on exposure to moisture and contain terminal alkoxysilane and/or NCO groups. EP-A-0 371 370 further discloses that these alkoxysilane end groups can be introduced via mercaptosilane or via a series of aminosilanes. Neither EP-A-0 371 370 nor EP-A-0 202 491 differentiates between aminosilanes and mercaptosilanes for the purpose of functionalizing the polymer.

Polymers prepared in this way, however, have the great disadvantage that, on prolonged heating, their viscosity may experience a sudden sharp increase.

An increase in viscosity of this kind at elevated temperature is highly disadvantageous, particularly in applications in which the adhesive spends a relatively long time at the application temperature. Applications of this kind frequently occur in industrial manufacture, for example.

SUMMARY OF THE INVENTION

It is an object of the present invention, therefore, to provide moisture-curing hotmelt adhesives which lead neither to blistering on heating and curing nor to a sharp rise in viscosity on prolonged storage at the application temperature.

Surprisingly it has been found that this object can be achieved with moisture-curing hotmelt adhesive compositions of claim 1.

They are suitable more particularly for the adhesive bonding of transparent materials, more particularly for the bonding of glass and panes or of see-through packaging. The compositions cure without blisters and, surprisingly, possess very good shelf life (stability of viscosity) even at high temperatures.

It has further emerged that, through the use of mercaptosilanes of the formula (II), it is possible to obtain silane-functional polyurethane prepolymers from polyurethane prepolymers containing isocyanate groups which are able to achieve significant improvements in the shelf life (stability of viscosity) of the hotmelt adhesives at high temperatures. It has further emerged that the use of silane-functional polyurethane prepolymers of the formula (I) in hotmelt adhesives leads to an improvement in the shelf life (stability of viscosity) of moisture-curing hotmelt adhesives at high temperatures.

Further aspects of the invention are a method of adhesive bonding of claim 11, and also an article, obtained by this method, of claim 17.

Further embodiments are subject matter of the dependent claims.

DESCRIPTION OF THE PREFERRED EMBODIMENTS

The invention provides moisture-curing hotmelt adhesive compositions comprising at least one silane-functional polyurethane prepolymer of the formula (I)

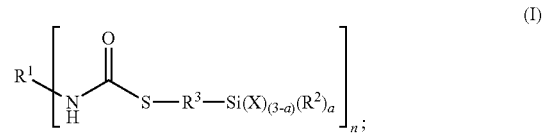

where
$R^1$ is an n-valent organic radical of a prepolymer P, which is prepared from at least one polyol and at least one polyisocyanate and has at least n isocyanate groups, following removal of n isocyanate groups;
$R^2$ is an alkyl group having 1 to 10 C atoms;
$R^3$ is a linear or branched alkylene group having 1 to 10 C atoms;

X is a hydrolyzable radical;
a is a value of 0, 1 or 2;
n is a value of 2 or more,
the prepolymer P being solid at room temperature and having no further silane group.

The prefix "poly" in substance names, such as "polyol" or "polyisocyanate", in the present document indicates that the substance in question contains formally more than one per molecule of the functional group that occurs in its name.

The term "silane group" in the present document identifies a group which is attached to an organic radical via a silicon atom and which is hydrolyzable—that is, has one to three hydrolyzable radicals. Hydrolysis of the silane group, as for example by contact with atmospheric moisture, is accompanied by formation of silanol groups (Si—OH groups) and, through subsequent condensation reactions of silanol groups, of siloxane groups (Si—O—Si groups).

The term "silane" identifies organic compounds of low molecular mass which carry at least one silane group. The term "silane-functional" identifies compounds, more particularly polymers, which contain silane groups.

Radicals that are understood by "hydrolyzable radical" are those radicals on a silane group which in a hydrolysis reaction are displaced by water integrally from the silicon atom, where they are formally replaced by a hydroxyl group. Through the hydrolysis reaction the hydrolyzable radical is protonated to a compound of low molecular mass, which may be organic or inorganic.

The hydrolyzable radicals X in the silane-functional polyurethane prepolymer of the formula (I) are in particular those which are typical in silicone chemistry, more particularly those selected from the group consisting of the formula (X-1), (X-2), (X-3), (X-4), (X-5), (X-6), (X-7), and (X-8).

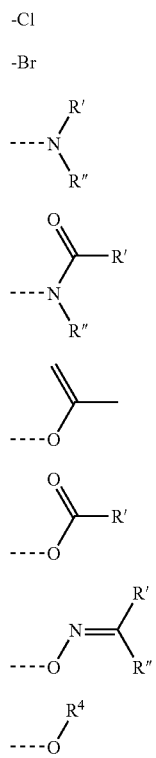

where R' and R" independently of one another are alkyl or aryl and $R^4$ is an alkyl group having 1 to 10 C atoms which optionally contains 1 or 2 ether oxygens, and more particularly is an alkyl group having 1 to 4 C atoms. With particular preference the hydrolyzable radical X is an alkoxy group —$OR^4$.

In one specific embodiment, two alkoxy groups —$OR^4$ may together be an alkylene dioxy group —$OR^{5O}$— which with the silicon atom forms a five- or six-membered ring, $R^5$ being an alkylene group having 2 to 10, more particularly 2 or 3, C atoms.

It is important that the prepolymer P has no further silane group. More particularly it is important that it has no silane groups of the kind which come about when an aminosilane reacts with an NCO group in the prepolymer P.

Silane names with functional groups as prefixes, such as "aminosilane" or "mercaptosilane", for example, identify silanes which carry the stated functional group on the organic radical as substituent.

It has proven beneficial if $R^3$ is propylene.

Furthermore, preference is given as hydrolyzable radical X to the radicals —Omethyl, —Oethyl or —O-isopropyl, more particularly —Omethyl.

It has emerged that it is advantageous if there are three hydrolyzable radicals on the respective silicon atom in the silane-functional polyurethane prepolymer of the formula (I)—that is, that for a the value 0 is preferred.

The prepolymer P is prepared from at least one polyol and at least one polyisocyanate.

Polyols preferred are polyether polyols, polyester polyols, and polycarbonate polyols.

Suitable polyether polyols, also called polyoxyalkylene polyols, are more particularly those which are polymerization products of ethylene oxide, 1,2-propylene oxide, 1,2- or 2,3-butylene oxide, tetrahydrofuran or mixtures thereof, optionally polymerized with the aid of a starter molecule having two or more active hydrogen atoms, such as water, for example, ammonia or compounds having two or more OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomeric butane-diols, pentanediols, hexanediols, heptanediols, octane-diols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the aforementioned compounds. It is possible to use not only polyoxyalkylene polyols which have a low degree of unsaturation (measured by ASTM D-2849-69 and reported in milliequivalents of unsaturation per gram of polyol (meq/g)), prepared, for example, with the aid of what are called double metal cyanide complex catalysts (DMC catalysts), but also polyoxyalkylene polyols having a higher degree of unsaturation, prepared, for example, with the aid of anionic catalysts such as NaOH, KOH or alkali metal alkoxides.

Particularly suitable polyether polyols are polyoxyalkylene diols or polyoxyalkylene triols, more particularly polyoxyethylene diols or polyoxyethylene triols.

Especially suitable are polyoxyalkylene diols or polyoxyalkylene triols having a degree of unsaturation of less than 0.02 meq/g and having a molecular weight in the range from 1000 to 30 000 g/mol, and also polyoxypropylene diols and triols having a molecular weight of 400 to 8000 g/mol.

Likewise particularly suitable are what are known as "EO-endcapped" (ethylene oxide-endcapped) polyoxypropylene diols or triols. The latter are special polyoxypropylene-polyoxyethylene polyols, obtained, for example, by subjecting pure polyoxypropylene polyols, after the end of the polypropoxylation, to alkoxylation with ethylene oxide, and having, as a result, primary hydroxyl groups. By 'molecular weight' or 'molar weight' is meant in the present document always the molecular weight average $M_n$.

The most suitable polyether polyols are diols having a degree of unsaturation of lower than 0.02 meq/g and having a molecular weight in the range from 7000 to 30 000, more particularly between 10 000 and 25 000 g/mol. Polyethers of this kind, for example, are sold under the trade name Acclaim® by Bayer.

Suitable polyester polyols are more particularly those prepared from dihydric to trihydric, preferably dihydric, alcohols, such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or mixtures of the aforementioned acids, and also polyester polyols formed from lactones such as, for example, from ε-caprolactone.

Particularly suitable polyester polyols are polyester polyols formed from adipic acid, sebacic acid or dodecanedicarboxylic acid as the dicarboxylic acid and from hexanediol or neopentyl glycol as the dihydric alcohol. The polyester polyols preferably have a molecular weight of 1500 to 15 000 g/mol, more particularly of 1500 to 8000 g/mol, preferably of 2000 to 5500 g/mol.

Particularly suitable crystalline or part-crystalline polyester polyols are adipic acid/hexanediol polyesters and dodecanedicarboxylic acid/hexanediol polyesters.

Suitable polycarbonate polyols are those of the kind obtainable by reacting, for example, the above-mentioned alcohols—those used to synthesize the polyester polyols—with dialkyl carbonates, diaryl carbonates or phosgene.

Preferred polyols are diols, more particularly polyether diols, polyester diols, and polycarbonate diols.

Particularly preferred polyols are polyester diols, more particularly a mixture of an amorphous polyester diol and a crystalline or part-crystalline polyester diol.

A polyisocyanate contains two or more NCO groups and in the present document describes in each case a low-molecular compound having a molecular weight of below 1000 g/mol.

Examples of polyisocyanates of this kind are aromatic polyisocyanates, such as 2,4- and 2,6-tolylene diisocyanate (TDI) and any desired mixtures of these isomers, 4,4'-, 2,4'-, and 2,2'-diphenylmethane diisocyanate and any desired mixtures of these isomers (MDI), mixtures of MDI and MDI homologs (polymeric MDI or PMDI), 1,3- and 1,4-phenylene diisocyanate, naphthalene 1,5-diisocyanate (NDI), 3,3'-dimethyl-4,4'-diisocyanatobiphenyl (TODI), oligomers and polymers of the aforementioned isocyanates, and also any desired mixtures of the aforementioned isocyanates. Particularly preferred aromatic polyisocyanates are MDI and TDI.

Further examples of such polyisocyanates are aliphatic and cycloaliphatic polyisocyanates, such as 1,6-hexa-methylene diisocyanate (HDI), 2-methylpentamethylene 1,5-diisocyanate, 2,2,4- and 2,4,4-trimethyl-1,6-hexa-methylene diisocyanate (TMDI), 1,12-dodecamethylene diisocyanate, cyclohexane 1,3- and 1,4-diisocyanate and any desired mixtures of these isomers, 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI), 1,4-diisocyanato-2,2,6-trimethylcyclohexane (TMCDI), m- and p-xylylene diisocyanate (m- and p-XDI), and m- and p-tetramethyl-1,3- and -1,4-xylylene diisocyanate (m- and p-TMXDI).

For the formulation of light-stable compositions it is preferred to use aliphatic and cycloaliphatic polyisocyanates.

More particularly the polyisocyanate is a diisocyanate having a molecular weight of less than 400 g/mol.

The prepolymer P is prepared in a known way directly from the polyisocyanates and the polyols, or by stepwise adduction processes, of the kind also known as chain extension reactions.

It is essential that the prepolymers P have free isocyanate groups and are solid at room temperature. The number of isocyanate groups is heavily dependent on the desired end properties of the cured adhesive. In one preferred embodiment the polyurethane prepolymer is prepared by a reaction of at least one polyisocyanate and at least one polyol, preferably one amorphous polyester polyol and one crystalline polyester polyol, with a stoichiometric excess of isocyanate groups.

The prepolymer P has a molecular weight of preferably above 2000 g/mol, more particularly a molecular weight between 2000 and 50 000 g/mol, preferably one between 4000 and 30 000 g/mol. Furthermore, the prepolymer P has n isocyanate groups. Depending on the functionality of the polyols and polyisocyanates used, n adopts a value of 2 or more. It is of advantage if n has a value of 2 to 4. In one preferred embodiment n is 2. It is clear to a person skilled in the art that the polyols and polyisocyanates used are typically mixtures having different functionalities. In other words, for example, a technical "diol" in actual fact, on the one hand, contains monools as well as the diol, so that the average functionality is not 2 but instead less than 2. On the other hand, technical "diols" may also include additions of triols, so that the average functionality is not 2 but instead more than 2.

The preparation of the silane-functional polyurethane prepolymer of the formula (I) is accomplished preferably through the reaction of a prepolymer P, as described above, with a mercaptosilane of the formula (II)

$$HS—R^3Si(X)_{(3-a)}(R^2)_a \qquad (II)$$

where the radicals have the definitions and preferences already described for formula (I).

Examples of suitable mercaptosilanes are mercapto-methyltrimethoxysilane, mercaptomethyltriethoxysilane, mercaptomethyldimethoxymethylsilane, mercaptomethyldiethoxymethylsilane, 3-mercaptopropyltrimethoxysilane, 3-mercaptopropyltriethoxysilane, 3-mercaptopropyltriisopropoxysilane, 3-mercaptopropyl-methoxy(1,2-ethylenedioxy)silane, 3-mercaptopropylmethoxy(1,2-propylenedioxy)silane, 3-mercaptopropylethoxy(1,2-propylenedioxy)silane, 3-mercaptopropyldimethoxymethylsilane, 3-mercaptopropyldiethoxymethylsilane, 3-mercapto-2-methylpropyltrimethoxysilane, 4-mercapto-3,3-dimethylbutyltrimethoxysilane.

Preferred mercaptosilanes are 3-mercaptopropyltrimethoxysilane and 3-mercaptopropyltriethoxysilane, more particularly 3-mercaptopropyltrimethoxysilane.

The reaction of the prepolymer P containing isocyanate groups with mercaptosilane takes place in a known way.

Depending on the amount of mercaptosilane used, all of the isocyanate groups of the prepolymer P undergo reaction, or there remain isocyanate groups left over. In the first case, the mercaptosilane is used stoichiometrically or superstoichiometrically, and a silane-functional polyurethane prepolymer of the formula (I) is formed which contains no isocyanate groups; in other words, all of the n isocyanate groups of the prepolymer P have been consumed by reaction. In the second case, the mercaptosilane is used substoichiometrically, and a silane-functional polyurethane prepolymer of the formula (I) is formed which as well as the silane groups also contains isocyanate groups; in other words, not all of the n isocyanate groups of the prepolymer P have been consumed by reaction.

With certain applications it may be of technical advantage for the silane-functional polyurethane prepolymer of the formula (I) still to have isocyanate groups.

On toxicological grounds it is of advantage for the silane-functional polyurethane prepolymer of the formula (I) not to have any isocyanate groups.

The silane-functional polyurethane prepolymer of the formula (I) preferably has no isocyanate groups.

The moisture-curing hotmelt adhesive composition may comprise further additives such as plasticizers, fillers, adhesion promoters, UV absorbers, UV stabilizers or heat stabilizers, antioxidants, flame retardants, optical brighteners, catalysts, color pigments or dyes. Suitable catalysts are more particularly those which catalyze the hydrolysis and/or crosslinking of silane groups. Such catalysts include, for example, titanates, organotin compounds such as dibutyltin dilaurate and dibutyltin diacetylacetonate, organobismuth compounds or bismuth complexes, compounds containing amino groups, such as 1,4-diazabicyclo[2.2.2]octane or 2,2'-dimorpholinodiethyl ether, for example.

In one preferred embodiment the hotmelt adhesive composition is free from carbon black. Carbon black is often added as a filler, especially in polyurethane chemistry, more particularly in the case of conventional one-component polyurethane adhesives or in the case of one-component polyurethane warm melts, in order to improve the mechanical properties of the adhesive, and also in order to give the low-viscosity adhesives consistency. In a further preferred embodiment the adhesive is free from inorganic fillers. This is because the suitability of carbon black-filled adhesives is poor for those applications where the aesthetics of the adhesive bonds are classed as important, and in which at least one of the substrates to be bonded is transparent or translucent. In the preferred embodiment of a carbon black-free, and, respectively, of an inorganic filler-free, hotmelt adhesive composition, however, such applications are possible without adverse effect on the mechanical properties or application.

Important for the mode of action of a moisture-curing hotmelt adhesive is that the adhesive is meltable, in other words that, at the application temperature, it has a satisfactorily low viscosity, which permits reasonable application, and that, on cooling, it solidifies rapidly, with the consequence that it is quickly able to accommodate forces, even before the crosslinking reaction with atmospheric humidity is concluded. It has emerged that the moisture-curing hotmelt adhesive composition has at a temperature of 150° C. more particularly a viscosity of less than 100 000 mPas, more particularly of less than 50 000 mPas, and at 70° C. has a viscosity more particularly of more than 20 000 mPas, more particularly of more than 50 000 mPas.

The silane-functional polyurethane prepolymer of the formula (I) may also be admixed with other polyurethane prepolymers, which allows the shelf life (stability of viscosity) at elevated temperature of the moisture-curing hotmelt adhesive thus formed to be improved.

As a result of the influence of moisture or water, more particularly atmospheric moisture, the hydrolyzable radicals of the silane-functional polyurethane prepolymer of the formula (I) undergo hydrolysis, and lead to crosslinking.

The invention further embraces a method of adhesively bonding substrate S1 to substrate S2, comprising the steps of i) heating a moisture-curing hotmelt adhesive composition, of the kind described above, to a temperature between 85° C. and 200° C., more particularly between 120° C. and 160° C.;
ii) applying the heated moisture-curing hotmelt adhesive composition to a substrate S1;
iii) contacting the applied moisture-curing hotmelt adhesive composition with a second substrate S2;
the second substrate S2 being composed of the same material as or different material to the substrate S1.

Step iii) is typically then followed by a step iv) of chemically curing the moisture-curing hotmelt adhesive composition with atmospheric moisture. A person skilled in the art understands that, depending on the system used and the temperature and reactivity of the adhesive, crosslinking reactions, and hence chemical curing, may begin as early as during application. The major part of the crosslinking and hence, in the narrower sense of the term, of the chemical curing, however, takes place following application.

If required, substrates S1 and/or S2 may be pretreated prior to the application of the hotmelt adhesive composition. Such pretreatments encompass, more particularly, physical and/or chemical cleaning and activation processes, examples being grinding, sandblasting, brushing, corona treatment, plasma treatment, flame treatment, etching or the like, or treatment with cleaners or solvents, or the application of an adhesion promoter, an adhesion promoter solution or a primer.

The substrates S1 and S2 may constitute a multiplicity of materials. Suitability is possessed more particularly by plastics, organic materials such as leather, fabrics, paper, wood, resin-bound woodbase materials, resin-textile composite materials, glass, porcelain, ceramic, and also metals and metal alloys, more particularly painted or powder-coated metals and metal alloys.

Suitable plastics are more particularly polyvinyl chloride (PVC), acrylonitrile-butadiene-styrene copolymers (ABS), SMC (sheet molding composites), polycarbonate (PC), polyamide (PA), polyesters (PE), polyoxymethylene (POM), polyolefins (PO), more particularly polyethylene (PE) or polypropylene (PP), preferably PE or PP surface-treated by plasma, corona or flame.

Preferred materials for the substrates S1 and S2 are transparent materials, more particularly transparent polymeric films. Another preferred transparent material is glass, more particularly in the form of a pane.

The moisture-curing hotmelt adhesive composition is used more particularly in an industrial manufacturing operation.

The moisture-curing hotmelt adhesive composition is suitable more particularly for adhesive bonds in which the bond site is visible. Thus it is suitable on the one hand, more particularly, for the adhesive bonding of glass, especially in vehicle construction and window construction. On the other hand it is suitable, more particularly, for the adhesive bonding of see-through packaging.

The adhesive cures substantially without blisters. Typical thicknesses of adhesive bonds are 10 micrometers or more. More particularly the bond thickness is between 10 micrometers and 1000 micrometers, in particular between 80 micrometers and 500 micrometers. It has emerged that no blisters occur even in bond layer thicknesses of more than 80 micrometers.

The adhesive bonding method results in articles. Such articles are, on the one hand, more particularly, articles of the transport, furniture or textile sector. As a transport sector, preference is given more particularly to the automobile sector. Exemplary articles of this kind are automotive interior finishing components, such as roof linings, sun visors, instrument panels, door side parts, parcel shelves, and the like;

wood fiber materials from the shower and bath sector; decorative furniture foils, membrane films with textiles such as cotton, polyester films in the apparel sector, or textiles with foams for automotive finishing.

On the other hand, such articles are, more particularly, from the packaging sector. More particularly such an article comprises see-through packaging.

A further aspect of the present invention is the use of mercaptosilanes of the above-described formula (II) to modify polyurethane prepolymers containing isocyanate groups, for the purpose of improving the shelf life (stability of viscosity) of an uncured, silane-functional hotmelt adhesive.

$$HS—R^3—Si(X)_{(3-a)}(R^2)_a \qquad (II)$$

where the radicals have the definitions and preferences already described for formula (I).

Preferred mercaptosilanes are 3-mercaptopropyltrimethoxysilane and 3-mercaptopropyltriethoxysilane, more particularly 3-mercaptopropyltrimethoxysilane.

Accordingly it is possible, using mercaptosilanes of the formula (II), to obtain silane-functional polyurethane prepolymers, from polyurethane prepolymers containing isocyanate groups, through which the shelf life (stability of viscosity) of the hotmelt adhesives at high temperatures can be significantly improved, more particularly in comparison to the corresponding silane-functional polyurethane prepolymers which are obtained from aminosilanes and polyurethane prepolymers containing isocyanate groups. It has emerged, furthermore, that the use of silane-functional polyurethane prepolymers of the formula (I) in hotmelt adhesives leads to an improvement in the shelf life (stability of viscosity) of moisture-curing hotmelt adhesives at high temperatures.

A further aspect of the present invention is the use of a silane-functional polyurethane prepolymer of the formula (I) as already described above in hotmelt adhesives for the purpose of improving the shelf life (stability of viscosity) of the uncured adhesive.

It has surprisingly been found that a hotmelt adhesive based on silane-functional polyurethane prepolymers of the formula (I) possesses, at elevated temperature, a significantly better stability of viscosity than a corresponding prior-art adhesive which is based on silane-functional polyurethane prepolymers obtained from aminosilanes and polyurethane prepolymers containing isocyanate groups. The phenomenon whereby the increase in viscosity with storage time at high temperature, which corresponds more particularly to the application temperature, in other words, typically, at a storage temperature between 120° C. and 160° C., rises not at all or rises only very much more slowly and/or to a lesser extent, is referred to in this document by the term "shelf life" or "stability of viscosity".

Furthermore, in addition to the absence of blisters and improved viscosity stabilization, it has been found that the UV stability, more particularly the yellowing, of the moisture-curing hotmelt adhesive compositions can be greatly reduced through the use of cycloaliphatic polyisocyanates in preparing the prepolymer P, or the silane-functional polyurethane prepolymer of the formula (I).

EXAMPLES

In the text below, the substances and abbreviations used in table 1 have been used.

TABLE 1

| Abbreviations used | |
|---|---|
| A189 | 3-mercaptopropyltrimethoxysilane |
| A1110 | 3-aminopropyltrimethoxysilane |
| A1170 | bis(3-trimethoxysilylpropyl)amine |
| TMSDEE | diethyl N-(3-trimethoxysilylpropyl)aminosuccinate |
| TESDEE | diethyl N-(3-triethoxysilylpropyl)aminosuccinate |
| MDI | 4,4'-diphenylmethane diisocyanate (MDI) |
| H-MDI | perhydro-2,4'- and -4,4'-diphenylmethane diisocyanate |

Preparation of Prepolymers P

Prepolymer P1

A 1:1 (w:w) polyester mixture of Dynacoll® 7150 (Degussa) and Dynacoll® 7250 (Degussa) was charged to a 1 liter reaction vessel with nonstick coating and a 4-neck lid with ground glass joints. It was melted in an oil bath with temperature control at 120-125° C. for 4 h.

The liquid polyol mixture thus obtained was dewatered in a high vacuum with stirring for an hour, with the temperature maintained.

Then MDI in an NCO/OH molar ratio of 2:1 to the polyol was added to the reaction vessel and reaction was carried out with stirring for 2 h, with the temperature maintained. The prepolymer P1 thus prepared had an NCO content of 2.2% and a viscosity of 15 500 mPas at 130° C.

Prepolymer P2

The prepolymer P2 was prepared in a similar way to P1, with the exception that for P2 the polyester mixture was replaced stoichiometrically by the polyether polyol Desmophen® 4028 BD (Bayer). The prepolymer P2 thus prepared had an NCO content of 2.05% and a viscosity of 1875 mPas (10 rpm) at 70° C.

Preparation of Silane-Functional Polyurethane Prepolymers

The above-described prepolymer P1, and, respectively, P2, was admixed with the corresponding silane used stoichiometrically (one silane reacts with one NCO group), as per table 2, and with 0.2% by weight of dibutyltin dilaurate (DBTL) as catalyst, based on the prepolymer, and after a reaction time of 1 h the mixture was dispensed into tubes or cartridges. This ensured storage in the absence of moisture.

TABLE 2

| | Compositions. | | | | | | |
|---|---|---|---|---|---|---|---|
| | Ref. 1 | Ref. 2 | Ref. 3 | Ref. 4 | 1 | 2 | Ref. 5 |
| Silane | A1110 | TMSDEE | TESDEE | A1170 | A189 | A189 | TMSDEE |
| Prepolymer | P1 | P1 | P1 | P1 | P1 | P2 | P2 |

It emerged that in the course of preparation the comparative example Ref.1 underwent gelling. All of the other compositions could be prepared without gelling.

Shelf Life (Stability of Viscosity)

The viscosity measurement was carried out continuously at the respective temperature.

For the measurement of the shelf life (stability of viscosity), the viscosity η [mPas] of the respective composition was measured by means of a rheomat (Brookfield, Thermosel, spindle 27, shear rate 1 min$^{-1}$) after a storage time $T_s$ at the respective temperature T.

TABLE 3

Stability of viscosity at different temperatures.

| | Ref. 2 | | | Ref. 4 | | | 1 | | |
|---|---|---|---|---|---|---|---|---|---|
| | | | | T[° C.] | | | | | |
| η | 120 | 140 | 160 | 120 | 140 | 160 | 120 | 140 | 160 |
| $T_s = 2$ h | 10 000 | 2500 | 1200 | n.d. | 17 700 | 6000 | 107 300 | 38 500 | 7300 |
| $T_s = 4$ h | 8000 | 2200 | 90 000 | n.d. | 18 600 | 9100 | 110 300 | 39 000 | 7600 |
| $T_s = 6$ h | 7000 | 2200 | n.m. | n.d. | 20 000 | 92 000 | 113 300 | 39 800 | 8100 |
| $T_s = 8$ h | 6500 | 2600 | n.m. | n.d. | 21 600 | n.m. | 116 300 | 40 300 | 8600 |
| $T_s = 12$ h | 6100 | 20 200 | n.m. | n.d. | 26 700 | n.m. | 122 300 | 41 600 | 9300 |
| $T_s = 18$ h | 6200 | n.m. | n.m. | n.d. | 40 700 | n.m. | 132 000 | 43 600 | 10 000 | n.m. = not measurable,
n.d. = not measured.

TABLE 4

Stability of viscosity at 160° C.

| | Ref. 2 | Ref. 3 | Ref. 5 | 1 | 2 |
|---|---|---|---|---|---|
| | | | T[° C.] | | |
| η | 160 | 160 | 160 | 160 | 160 |
| $T_s = 2$ h | 1200 | 800 | 300 | 7300 | 600 |
| $T_s = 4$ h | 90 000 | 2700 | 700 | 7600 | 1200 |
| $T_s = 4.5$ h | n.m. | 43 300 | 1000 | 8100 | 1200 |
| $T_s = 6$ h | n.m. | n.m. | 2700 | 8100 | 1000 |
| $T_s = 8$ h | n.m. | n.m. | 16 400 | 8600 | 600 |
| $T_s = 9$ h | n.m. | n.m. | 41 400 | 8800 | 600 |
| $T_s = 12$ h | n.m. | n.m. | n.m. | 9300 | 700 |
| $T_s = 18$ h | n.m. | n.m. | n.m. | 10 000 | 800 | n.m. = not measurable

TABLE 5

Long-term stability of viscosity of composition 1 at a storage temperature of 160° C.

| | $T_s = 2$ h | $T_s = 4$ h | $T_s = 6$ h | $T_s = 8$ h | $T_s = 12$ h | $T_s = 18$ h | $T_s = 24$ h | $T_s = 48$ h | $T_s = 72$ h | $T_s = 90$ h |
|---|---|---|---|---|---|---|---|---|---|---|
| η | 7300 | 7600 | 8100 | 8600 | 9300 | 10 000 | 10 500 | 13 200 | 17 400 | 20 700 |

The results of tables 3 to 5 show that the compositions 1 and 2 are distinguished in relation to the reference examples by an extraordinarily improved stability on storage. Even at 160° C. the increase in viscosity is small, even after a long storage time, whereas the reference examples have already undergone such severe thickening that they can no longer be measured.

Blistering

To determine blistering, specimens were produced along the lines of the production of test specimens for the determination of Shore A hardness. The hot adhesive in this case was introduced at a temperature of approximately 140° C. into a Teflon ring (2 mm thickness). The adhesive was pressed onto the thickness with a weight (5 kg) and cooled. The cooled adhesive was subsequently demolded and cured at 20° C. and 55% humidity.

Blistering was carried out by visual assessment.

The reference used for a reactive hotmelt adhesive was the prepolymer P1.

TABLE 6

| | Blistering |
|---|---|
| 1 | no blistering |
| 2 | no blistering |
| P1 | severe blistering |

Mechanical Properties

Tensile Strength

In a method based on DIN 53504, rectangular test specimens measuring 2×12 cm were cut from a 500 µm thick cured film of composition 1. These test specimens were clamped into the tensile testing machine (Zwick Z 020) and pulled apart at a speed of 100 mm/min. The parameter measured was the maximum tensile force accommodated by the sample.

Tensile Shear Strength

The tensile shear strength of composition 1 was measured in a method based on DIN EN 1465 on a tensile testing machine from Zwick (Z 020) at a test speed of 100 mm/min. Two test specimens of the respective substrate were bonded (overlap 12×25 mm, adhesive layer thickness 2 mm) and tested.

The mechanical results of composition 1 are compiled in table 7.

TABLE 7

| Mechanical results of composition 1 | |
|---|---|
| Tensile strength | 27.3 ± 2.1 MPa |
| Tensile shear strength | |
| Beech | 5.9 MPa (wood fiber extraction) |
| ABS | 4.5 MPa |
| Polycarbonate | 3.7 MPa |

The invention claimed is:

1. A moisture-curing hotmelt adhesive composition comprising at least one silane-functional polyurethane prepolymer of the formula (I)

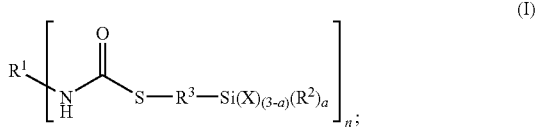

where
R¹ is an n-valent organic radical of a prepolymer P, which is prepared from at least one polyol and at least one polyisocyanate and has at least n isocyanate groups, following removal of n isocyanate groups;
R² is an alkyl group having 1 to 10 C atoms;
R³ is a linear or branched alkylene group having 1 to 10 C atoms;
X is a hydrolyzable radical selected from the group consisting of

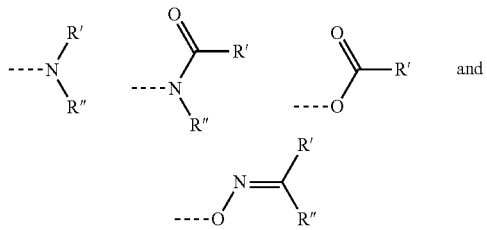

where R' is an aryl group and, if present, R" is an aryl group;
a is a value of 0, 1 or 2;
n is a value of 2 or more,
the prepolymer P having a molecular weight of above 2000 g/mol, being solid at room temperature, and having no further silane group; wherein the silane-functional polyurethane prepolymer of the formula (I) is obtained from the reaction of a polyurethane prepolymer P having at least n isocyanate groups with a mercaptosilane of the formula (II):

where X, R² and R³ are defined as set forth above.

2. The moisture-curing hotmelt adhesive composition of claim 1, wherein R³ is propylene.

3. The moisture-curing hotmelt adhesive composition of claim 1, wherein a is the value 0.

4. The moisture-curing hotmelt adhesive composition of claim 1, wherein the polyol is a diol, and the polyisocyanate is a diisocyanate having a molecular weight of less than 400 g/mol.

5. The moisture-curing hotmelt adhesive composition of claim 1, wherein the silane-functional polyurethane prepolymer of the formula (I) has isocyanate groups.

6. The moisture-curing hotmelt adhesive composition of claim 1, wherein at a temperature of 150° C. it has a viscosity of less than 100 000 mPas, and at a temperature of 70° C. it has a viscosity of more than 20 000 mPas.

7. The moisture-curing hotmelt adhesive composition of claim 1, wherein the at least one polyol is selected from the group consisting of polyether polyols, polyester polyols, and polycarbonate polyols.

8. The moisture-curing hotmelt adhesive composition of claim 1, wherein the prepolymer P molecular weight is between 2000 and 50,000 g/mol.

9. The moisture-curing hotmelt adhesive composition of claim 1, wherein the prepolymer P molecular weight is between 4000 and 30,000 g/mol.

10. A method for improving the stability of viscosity and shelf life of an uncured hotmelt adhesive, by providing the silane-functional polyurethane prepolymer of the formula (I) in claim 1 in the hotmelt adhesive.

11. A method of adhesively bonding substrate S1 to substrate S2, comprising the steps of
i) heating a moisture-curing hotmelt adhesive composition of claim 1 to a temperature between 85° C. and 200° C.;
ii) applying the heated moisture-curing hotmelt adhesive composition to a substrate S1;
iii) contacting the applied moisture-curing hotmelt adhesive composition with a second substrate S2;
the second substrate S2 being composed of the same material as or different material to the substrate S1.

12. The method of claim 11, wherein step iii) is followed by a step iv) of chemically curing the moisture-curing hotmelt adhesive composition with atmospheric moisture.

13. The method of claim 11, wherein at least one of the substrates, S1 or S2, is a transparent material.

14. The method of claim 13, wherein at least one of the substrates, S1 or S2, is glass.

15. The method of claim 11, wherein the adhesive bonding takes place in an industrial manufacturing operation.

16. The method of claim 11, wherein the thickness of the layer of adhesive is 10 micrometers to 1000 micrometers.

17. An article bonded by an adhesive bonding method of claim 11.

18. The article of claim 17, wherein the article is see-through packaging.

19. The article of claim 17, wherein the article is an article of the transport, furniture or textile sector.

20. A method for improving the stability of viscosity and shelf life of an uncured, silane-functional hotmelt adhesive, comprising modifying polyurethane prepolymers containing isocyanate groups using a mercaptosilanes of the formula

where
R² is an alkyl group having 1 to 10 C atoms;
R³ is a linear or branched alkylene group having 1 to 10 C atoms; and
X is a hydrolyzable radical selected from the group consisting of

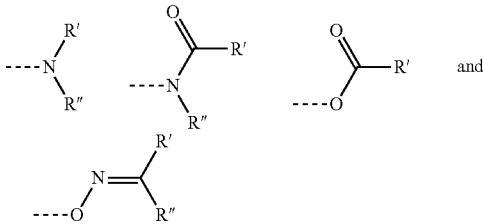

where R' is an aryl group and, if present, R" is an aryl group;
a is a value of 0, 1 or 2.

* * * * *